United States Patent
Yamakawa et al.

(10) Patent No.: US 8,523,452 B2
(45) Date of Patent: Sep. 3, 2013

(54) BEARING STRUCTURE AND MANUFACTURING METHOD THEREOF

(75) Inventors: Kazuyoshi Yamakawa, Nishinomiya (JP); Takashi Sada, Kashiwara (JP)

(73) Assignee: Jtekt Corporation, Osaka-shi, Osaka (JP)

( * ) Notice: Subject to any disclaimer, the term of this patent is extended or adjusted under 35 U.S.C. 154(b) by 655 days.

(21) Appl. No.: 12/733,408

(22) PCT Filed: Aug. 29, 2008

(86) PCT No.: PCT/JP2008/065571
§ 371 (c)(1),
(2), (4) Date: Feb. 26, 2010

(87) PCT Pub. No.: WO2009/028678
PCT Pub. Date: Mar. 5, 2009

(65) Prior Publication Data
US 2010/0172607 A1    Jul. 8, 2010

(30) Foreign Application Priority Data

| | | |
|---|---|---|
| Aug. 31, 2007 | (JP) | 2007-225083 |
| Sep. 27, 2007 | (JP) | 2007-251223 |
| Sep. 27, 2007 | (JP) | 2007-251765 |

(51) Int. Cl.
*F16C 33/58* (2006.01)
*F16C 19/00* (2006.01)

(52) U.S. Cl.
USPC .................................... 384/570; 384/457

(58) Field of Classification Search
USPC ................ 384/457, 548, 558, 564, 569, 570, 384/571; 123/195 R
See application file for complete search history.

(56) References Cited

U.S. PATENT DOCUMENTS

| 7,270,484 B2 | 9/2007 | Waseda |
| 7,311,447 B2 | 12/2007 | Takeo et al. |

(Continued)

FOREIGN PATENT DOCUMENTS

| CN | 2102168(U.M.) | 4/1992 |
| CN | 2731143 (Y) | 10/2005 |

(Continued)

OTHER PUBLICATIONS

Japanese Office Action for Patent Application No. 2007-251765, dated Jul. 3, 2012, with English translation.

(Continued)

*Primary Examiner* — James Pilkington
(74) *Attorney, Agent, or Firm* — McGinn IP Law Group, PLLC

(57) ABSTRACT

A bearing structure includes a housing including a first housing portion and a second housing portion forming together with the first housing portion, a cross-sectionally generally-circular support hole, and a rolling bearing including a pair of outer rings mounted within the support hole of the housing in closely-contacted relation thereto, a plurality of rolling elements mounted to be able to roll on inner side surfaces of the pair of outer rings, and a pair of cages holding the rolling elements. The first housing portion and the second housing portion are mounted in an offset relation to each other in a radial direction so that at mating surfaces of circumferential end portions of the pair of outer rings, the outer ring end portions disposed at an upstream side with respect to a direction of rotation of the shaft form radially inwardly-projecting steps, respectively.

7 Claims, 16 Drawing Sheets

(56) References Cited

U.S. PATENT DOCUMENTS

| | | | |
|---|---|---|---|
| 2003/0012470 A1 | 1/2003 | Sugimori et al. | |
| 2005/0259904 A1 | 11/2005 | Nishi et al. | |
| 2006/0084192 A1 | 4/2006 | Zhang | |
| 2007/0223854 A1* | 9/2007 | Waseda et al. | 384/584 |
| 2009/0126195 A1 | 5/2009 | Takeo et al. | |

FOREIGN PATENT DOCUMENTS

| | | |
|---|---|---|
| CN | 1254614 C | 5/2006 |
| JP | 55-36643 A | 3/1980 |
| JP | 59-24532 | 2/1984 |
| JP | 2002-525533 A | 8/2002 |
| JP | 2005-180459 | 7/2005 |
| JP | 2005-337352 | 12/2005 |
| JP | 2006-125606 | 5/2006 |
| JP | 2006-258138 | 9/2006 |
| JP | 2006-292132 | 10/2006 |
| JP | 2006-329382 | 12/2006 |
| JP | 2006-336765 | 12/2006 |
| JP | 2008-258138 A | 10/2008 |

OTHER PUBLICATIONS

Japanese Office Action for Patent Application No. 2007-251223, dated Jul. 3, 2012, with English translation.
Chinese Office Action dated Jul. 22, 2011, with English translation.
Extended Eurpean Search Report dated Feb. 8, 2013.
Chinese Office Action dated Feb. 17, 2013 with English Translation.

* cited by examiner (a)

(b)

(a)

(b)

BEARING STRUCTURE AND MANUFACTURING METHOD THEREOF

BACKGROUND OF THE INVENTION

The present invention relates to a bearing structure and a manufacturing method thereof. More specifically, the invention relates to a bearing structure comprising a divided-type rolling bearing suitable for supporting a shaft such as a crankshaft and a camshaft in an engine and a housing for supporting the rolling bearing, and also relates to a manufacturing method thereof.

In an engine of an automobile, a ship or others, a bearing for supporting a crankshaft for converting a reciprocal movement of a piston into a rotational movement is disposed between counterweights or between a counterweight and a con rod larger end portion, and therefore a divided-type bearing (two-division bearing) divided circumferentially into two sections has been used as it.

A slide bearing has heretofore been used as the above supporting bearing. However, in recent years, there is an increasing demand for engines having a less fuel consumption, and therefore it has been proposed to use, instead of the slide bearing, a divided-type rolling bearing (two-division rolling bearing) divided in a circumferential direction.

The divided-type rolling bearing comprises, for example, a pair of two-division outer rings, a plurality of rollers so mounted as to be able to roll on inner side surfaces of the two two-division outer rings, and a pair of two-division cages holding the rollers such that the rollers are arranged at generally-equal intervals in the circumferential direction. A crankshaft is internally fitted, as an inner ring member, to the rolling bearing.

By the way, in the above divided-type rolling bearing, circumferential end faces of the pair of two-division outer rings are held against each other to form mating surfaces, and in the mating surface, a radial offset may develop at the opposed outer ring both end portions. As a result, a radially inwardly-projecting step is formed at the mating surface, and there is a problem that vibration and noise are generated when the roller passes this step.

Therefore, in order to eliminate effects of such step, it has been proposed to apply processing such as the formation of inclined surfaces at the circumferential end portions of the outer rings (for example, see Patent Literatures 1 to 2).

A two-division- outer ring 30 formed by curving a strip-like metal sheet into a generally semicircular shape is disclosed in Patent Literature 1, and as shown in FIG. 15(a), it is described that at least one circumferential end of the two-division outer ring 30 is formed into a convex-concave shape including an inclined portion 31 inclined relative to a line extending along an axial direction and an inclined portion 32 inclined toward the opposite side of the inclined portion 31. Also, it is described that a corner portion 33 of the one circumferential end disposed at the inner side surface is formed into a round shape (see FIG. 15(b)).

In Patent Literature 2, as shown in FIG. 16, there is disclosed a bearing in which butting portions of both circumferential ends of two-division outer rings 40 are constructed by fitting a V-shaped convex portion 41, projecting in a circumferential direction, and a V-shaped convex portion 42, recessed in the circumferential direction, to each other. Circumferential both end portions of an inner peripheral surface of each outer ring on which rollers rolls are inclined to become closer to an outer peripheral surface toward the respective end edges, thereby gradually decreasing a radial thickness dimension toward the circumferential end edge.

In the bearings described in Patent Literatures 1 and 2, it is mentioned that the development of a step can be prevented by the above rounded corner portion or the above inclinations.

On the other hand, in the above divided-type rolling bearing, there are fears that the divided outer ring may rotate in the circumferential direction relative to the housing and that it may move in the axial direction. Above all, in the above divided-type rolling bearing, for example, in the case where a housing made of aluminum alloy is used as the housing in order to achieve a lightweight design, a larger difference in coefficient of linear expansion develops between the housing and the outer ring, depending on the kind of a material used for the outer ring. Therefore, there are fears that the rotation of the outer ring in the circumferential direction and the movement of the outer ring in the axial direction are more liable to occur with a temperature rise during the operation of an engine.

Therefore, there has been proposed a divided-type rolling bearing device (Patent Literature 3) constructed such that in order to suppress the rotation of an outer ring together with a shaft when in use, an outwardly-projecting rotation prevention portion is formed on an outer peripheral surface of the outer ring by a press-shaping processing, and the rotation prevention portion is fitted in a hole formed in a bearing housing.

Furthermore, in the above divided-type rolling bearing, the circumferential end faces of the pair of two-division outer rings are held against each other to form the mating surfaces, and in the mating surface, a radial offset may develop at the opposed outer ring both end portions, depending on a processed condition of a fitting surface of the housing for receiving the outer ring or on an error in the mounting of the outer ring on the housing. As a result, a radially inwardly-projecting step is formed at the mating surface, and there are fears that vibration and noise may be generated when the roller passes this step and that premature damage such as cracking, chipping and separation of the rollers and outer ring may occur.

Therefore, in order to eliminate effects of such step, it has been proposed to apply processing such as the formation of inclined surfaces at the circumferential end portions of the outer ring (for example, see Patent Literature 4).

In Patent Literature 4, there is disclosed a rolling bearing comprising an outer ring having division surface portions combined together, and a cage which receives a plurality of rollers for rolling along an inner peripheral surface of the outer ring and is mounted on the inner peripheral surface of the outer ring. It is described that each division surface portion of the outer ring has a surface inclined relative to an axial direction and that the inner peripheral surface side of the division surface portion has an inclined surface inclined at least in a radial direction and gradually decreasing in thickness toward a distal end. In the bearing described in Patent Literature 4, it is mentioned that the generation of a step can be prevented by the above inclined surface.

Further, it has been proposed to vary a radial dimension of an outer ring in accordance with a circumferential position (for example, see Patent Literature 5).

In Patent Literature 5, there is described a rolling bearing in which an outside diameter shape of each of two halves of the divided outer ring is formed into a half circle obtained by dividing one true circle into two, and an inside diameter shape of the two halves of the divided outer ring is formed into a partial circle having a deformed portion at part of a half circle obtained by dividing one true circle into two, and the center of the partial circle is offset a predetermined amount from the bearing center.

Patent Literature 1: JP-A-2005-337352 Publication
Patent Literature 2: JP-A-2006-125606 Publication
Patent Literature 3: JP-A-2006-329382 Publication
Patent Literature 4: JP-A-2006-336765 Publication
Patent Literature 5: JP-A-2006-258138 Publication

BRIEF SUMMARY OF THE INVENTION

However, the heretofore-proposed divided-type rolling bearing devices and manufacturing methods thereof have the following problems.

In the bearings described in Patent Literatures 1 and 2, there are problems that the inclined portions, the V-shaped convex portions and so on need to be formed at the circumferential end portions of the two-division outer rings and that the processing is complicated, and because of this, the manufacturing cost becomes high.

Furthermore, the outer ring is elastically deformed by the rolling element load, and therefore even if a step is not formed at the mating surface when in a stationary condition, a step may develop at those portions of an outer ring race surface disposed at the forward and rearward sides of the mating surface because of the elastic deformation by the rolling element load. However, none of the conventional techniques including Patent Literatures 1 and 2 do not direct the attention to the step developing during the rolling movement of the rollers.

In the divided-type rolling bearing device described in the above Patent Literature 3, the rotation prevention portions of the outer rings are formed by the press-shaping processing, and also the corresponding holes are formed in the housing, and therefore the number of the process steps increases, and therefore the manufacturing cost becomes high. In addition, the two-division outer rings are not integrated with each other, and it is thought that the two outer rings may be offset from each other in the radial direction at the time of mounting them, and in order to avoid this, at the time of the mounting operation, the worker need to accurately effect the positioning and then to integrate the outer rings with each other.

In the bearing described in Patent Literature 4, there are problems that the inclined surface need to be formed at the inner peripheral surface side of the division surface portion of the outer ring and that the processing is complicated, and because of this, the manufacturing cost increases.

In the bearing described in Patent Literature 5, also, there are problems that the thickness-varying processing need to be applied, that a hardening processing such as hardening and polishing need to be applied and that the processings are complicated, and because of this, the manufacturing cost becomes high.

The present invention has been made in view of these circumstances, and its object is to provide a bearing structure and a manufacturing method thereof, in which the processing during the manufacture is easy, and the manufacturing cost can be reduced. Further, it is an object to provide a bearing structure, in which the development of a step due to elastic deformation by a rolling element load can be prevented, and a bearing structure in which a positional offset of two-division outer rings in both a circumferential direction and an axial direction of a housing can be suppressed, and the two two-division rings are integrated with each other and can be prevented from being separated.

Means for Solving the Problem

A bearing structure according to a first aspect of the present invention comprises:

a housing comprising a first housing portion having a cross-sectionally generally-semicircular concave portion and a second housing portion having a cross-sectionally generally-semicircular concave portion forming together with the concave portion of the first housing portion a cross-sectionally generally-circular support hole; and a two-division rolling bearing comprising a pair of two-division outer rings mounted within the support hole of the housing in closely-contacted relation thereto, a plurality of rolling elements so mounted as to be able to roll on inner side surfaces of the two two-division outer rings, and a pair of two-division cages holding the rolling elements such that the rolling elements are arranged at generally equal intervals in a circumferential direction, a shaft being internally fitted to the two-division rolling bearing; and is characterized in that:

a bore diameter of the support hole in a direction of mating surfaces of the housing portions is made larger than its bore diameter in a direction shifted 90° from the direction of the mating surfaces.

In the bearing structure of the present invention, when the direction connecting the surfaces (the housing portion mating surfaces. These exist at two regions at an equal interval in the circumferential direction.) at which the circumferential end portions of the first housing portion and the circumferential end portions of the second housing portion abut against each other is defined as the direction of the housing mating surfaces, the bore diameter of the support hole (in which the two-division rolling bearing is internally fitted) in the direction of the housing portion mating surfaces is made larger than the bore diameter in the direction shifted 90° from the direction of the mating surfaces. Namely, the cross-sectional shape of the support hole is not formed into a true circle, but is formed into such a shape that the bore diameter in the direction of the housing portion mating surfaces is larger. By doing so, spaces larger than the diameter of the rolling element can be formed between the outer peripheral surface of the shaft and the inner peripheral surfaces of the outer rings in the vicinities of the mating surfaces. As a result, the rolling element can pass the vicinities of the mating surfaces without sliding contact with the inner peripheral surfaces of the outer rings in the vicinities of the mating surfaces. Even if a step is formed at the outer ring end portion at the mating surface, the generation of vibration and noise by this step when the rolling element passes can be prevented. Also, premature damage such as cracking, chipping and separation of the rolling elements and the outer rings can be prevented from occurring.

The adjustment of the inside diameters of the concave portions of the two housing portions can be easily effected by machining, and the manufacturing cost can be reduced.

By shifting centers of curvature of the concave portions of the first housing portion and the second housing portion from each other respectively in opposite directions along the direction shifted 90° from the direction of the mating surfaces, the bore diameter in the direction of the housing portion mating surfaces can be made larger than the bore diameter in the direction shifted 90° from the direction of the mating surfaces. By doing so, the spaces larger than the diameter of the rolling element can be formed between the outer peripheral surface of the shaft and the inner peripheral surfaces of the outer rings in the vicinities of the mating surfaces, and the rolling element can pass the vicinities of the mating surfaces without sliding contact with the inner peripheral surfaces of the outer rings in the vicinities of the mating surfaces.

By forming the shape of the support hole into an elliptical shape, the bore diameter in the direction of the housing portion mating surfaces can be made larger than the bore diameter in the direction shifted 90° from the direction of the mating surfaces. In this case, also, the spaces larger than the diameter of the rolling element can be formed between the outer peripheral surface of the shaft and the inner peripheral surfaces of the outer rings in the vicinities of the mating surfaces, and the rolling element can pass the vicinities of the mating surfaces without sliding contact with the inner peripheral surfaces of the outer rings in the vicinities of the mating surfaces.

It is preferred that the bore diameter in the direction of the housing portion mating surfaces be made larger 0.01 to 1 mm than the bore diameter in the direction shifted 90° from the direction of the mating surfaces. By doing so, the above vibration and noise and premature damage can be prevented from occurring while allowing the rolling elements to roll smoothly.

A bearing structure according to a second aspect of the present invention comprises:

a housing comprising a first housing section having a radially-cross-sectionally generally-semicircular concave portion and a second housing section having a radially-cross-sectionally generally-semicircular concave portion, a radially-cross-sectionally generally-circular support hole being formed by the concave portions; and a two-division rolling bearing comprising a pair of two-division outer rings divided in a circumferential direction as two sections and mounted within the support hole in closely-contacted relation thereto, a plurality of rolling elements so mounted as to be able to roll on inner side surfaces of the two-division outer rings, and a pair of two-division cages divided in the circumferential direction as two sections and guiding and holding the plurality of rolling elements at predetermined intervals in the circumferential direction, a shaft being internally fitted to the two-division rolling bearing; and is characterized in that:

in order that a projecting portion having a radially outwardly-directed height can be provided at least one of mating surfaces formed by circumferential end portions of the pair of two-division outer rings abutting against each other, the circumferential end portions of the pair of two-division outer rings are fixed to each other; and notch portions, which have a radially outwardly-directed depth and form a recess portion at a circumferential inner side surface of the housing (which recess portion has such a shape as to be fitted on the projecting portion) in a condition in which a circumferential end face of the first housing section and a circumferential end face of the second housing section are held against each other, are formed respectively in radially-inward sides of circumferential end portions of the first housing section and the second housing section abutting against each other; and the two-division outer rings are fixed against movement in both the circumferential direction and the axial direction by the fitting of the recess portion to the projecting portion.

In the above bearing structure, the projecting portion is provided at the at least one of the mating surfaces formed by the circumferential end portions of the pair of two-division outer rings abutting against each other, and the notch portions which form the recess portion finable to the projecting portion are formed respectively in the radially-inward sides of the circumferential end portions of the first housing section and the second housing section abutting against each other.

The projecting portion can be easily provided, for example, by fixing the mating surface portions of the two two-division outer rings, and the notch portions can be easily provided, for example, merely by using a mold having such a shape as to form the notch portions at the time of manufacturing the first housing section and the second housing section. When the recess portion and the projecting portion are fitted together, the two-division outer rings are fixed against movement in both the circumferential direction and the axial direction, and therefore a positional offset of the two-division outer rings in both the circumferential direction and the axial direction can be suppressed. And besides, the two two-division outer rings are integrated with each other by the fixing, and therefore can be prevented from being separated from each other. In the bearing structure of the present invention, merely by fixing the end portions of the two two-division outer rings without beforehand applying a special processing such as a press-shaping processing, a boring processing and a knurling processing to the two-division outer rings in order to suppress a positional offset in the circumferential direction and the axial direction, a positional offset in the circumferential direction and the axial direction can be easily suppressed, and also the two two-division outer rings can be integrated with each other. Thus, in the bearing structure of the present invention, the processing is easy, and as a result the manufacturing cost can be reduced.

In the bearing structure of the present invention, it is preferred that the fixing at the at least one of the mating surfaces formed by the circumferential end portions of the two-division outer rings abutting against each other be effected by welding. In this case, the projecting portion can be easily formed merely by welding the mating surface portions of the two two-division outer rings together.

A bearing structure according to a third embodiment of the present invention comprises:

a housing comprising a first housing portion having a cross-sectionally generally-semicircular concave portion and a second housing portion having a cross-sectionally generally-semicircular concave portion forming together with the concave portion of the first housing portion a cross-sectionally generally-circular support hole; and a two-division rolling bearing comprising a pair of two-division outer rings mounted within the support hole of the housing in closely-contacted relation thereto, a plurality of rolling elements so mounted as to be able to roll on inner side surfaces of the two two-division outer rings, and a pair of two-division cages holding the rolling elements such that the rolling elements are arranged at generally equal intervals in a circumferential direction, a shaft being internally fitted to the two-division rolling bearing; and is characterized in that:

the first housing portion and the second housing portion are mounted in offset relation to each other in a radial direction so that at mating surfaces of circumferential end portions of the pair of two-division outer rings, the outer ring end portions disposed at an upstream side with respect to a direction of rotation of the shaft can form radially inwardly-projecting steps, respectively; and a size of the step is so set as to be generally equal to the amount of elastic deformation by a rolling element load which the outer ring end portion disposed at the upstream side with respect to the direction of rotation of the shaft receives from the rolling elements.

In the above bearing structure, the first housing portion and the second housing portions are mounted in offset relation in the radial direction so that the steps can be formed respectively at the mating surfaces of the circumferential end portions of the pair of two-division outer rings. And, the size (the amount of radially inwardly projecting) of the step is so set as to be generally equal to the amount of elastic deformation by the rolling element load which the outer ring end portion disposed at the upstream side with respect to the direction of rotation of the shaft receives from the rolling elements.

By thus beforehand mounting the two division-outer rings in offset relation in the radial direction in accordance with the expected elastic deformation, a raceway surface is formed into a continuous surface by the elastic deformation due to the rolling element load, and the generation of vibration and noise when the rolling element passes can be suppressed.

Furthermore, inclined surfaces and rounded corner portions as in the conventional techniques do not need to be formed at the circumferential end portions of the outer rings, and it is only necessary to merely mount the first housing portion and the second housing portion (which form the housing for supporting the bearing) such that they are offset from each other in the radial direction by a predetermined amount. Therefore, the processing is simple, and the manufacturing cost can be reduced.

It is preferred that a lubricating coating be formed on the mating surface and its neighboring outer ring inner peripheral surface. In this case, the lubricating coating is formed on the mating surface and its neighboring outer ring inner peripheral surface, and by doing so, even when a slight step develops at the mating surface, the step can be made smooth by covering the vicinities of this step with the lubricating coating, and noise and vibration generated when the rolling element passes the step can be suppressed.

It is preferred that the lubricating coating is made of a soft synthetic resin. In this case, a corner of the lubricating coating comes off when the rolling element passes the step, and the taken-off coating portion fills up the step. As a result, the step is eliminated, and because of the lubricating coating, the rolling element can smoothly pass the step portion.

A bearing structure manufacturing method of the present invention is characterized by including:

(I) the step of mounting a two-division rolling bearing, comprising a pair of two-division outer rings, a plurality of rolling elements so mounted as to be able to roll on inner side surfaces of the two-division outer rings, and a pair of two-division cages guiding and holding the plurality of rolling elements at predetermined intervals in a circumferential direction, on a shaft, and fixing at least one of mating surfaces formed by circumferential end portions of the pair of two-division outer rings abutting against each other so that a projecting portion having a radially outwardly-directed height can be provided; and (II) the step of mounting a first housing portion which has a notch portion (having a radially outwardly-directed depth) formed in a radially-inward side of a circumferential end portion thereof and also has a radially-cross-sectionally generally-semicircular concave portion and a second housing portion which forms together with the notch portion of the first housing portion a recess portion so shaped as to fit on the projecting portion and also has a radially-cross-sectionally generally-semicircular concave portion on the two-division rolling bearing fixed in the step (I) so that the recess portion can fit on the projecting portion, the first housing portion and the second housing portion forming a housing having a radially-cross-sectionally generally-circular support hole for supporting the two-division rolling bearing obtained in the step (I).

In the manufacturing method of the present invention, in the step (I), the two-division rolling bearing is mounted on the shaft, and the two-division outer rings of the two-division rolling bearing are fixed together, thereby forming the projecting portion at the at least one of the mating surfaces. In the step (II), by mounting the first housing section and the second housing section on the two-division rolling bearing, the recess portion is formed. The recess portion is fitted to the projecting portion, and therefore the positioning of the housing can be easily effected, and also a positional offset of the two-division outer rings in the circumferential direction and the axial direction can be suppressed. Thus, in the manufacturing method of the present invention, as compared with the case where a special processing for suppressing a positional offset in the circumferential direction and the axial direction is beforehand applied to the two-division outer rings themselves, the processing for preventing a positional offset can be easily applied with a smaller number of steps. And, in the manufacturing method of the present invention, there can be obtained the bearing structure in which a positional offset of the two-division outer rings in both the circumferential direction and the axial direction is suppressed, and also the two-division outer rings are integrated with each other.

In the bearing structure of the present invention, as the shaft internally fitted to the bearing, a crankshaft supporting a larger-diameter portion of a con rod, a camshaft having a cam formed thereon or the like is suitably used. By using the bearing structure as the bearing for supporting such a shaft, there can be produced an engine in which a rotation loss of the shaft is reduced so as to achieve a less fuel consumption.

In the bearing structure and the manufacturing method of the present invention, the processing during the manufacture is easy, and the manufacturing cost can be reduced. The development of a step due to the elastic deformation by the rolling element load can be prevented.

Further, in the bearing structure and the manufacturing method of the present invention, there are achieved excellent advantages that the development of a step due to the elastic deformation by the rolling element load can be prevented and that a positional offset of the two-division outer rings in both the circumferential direction and the axial direction is suppressed, and also the two two-division outer rings are integrated with each other and can be prevented from being separated.

DETAILED DESCRIPTION OF THE INVENTION

Embodiments of bearing structures of the present invention will hereafter be described in detail with reference to the accompanying drawings.

(First Embodiment)

Figure 1:
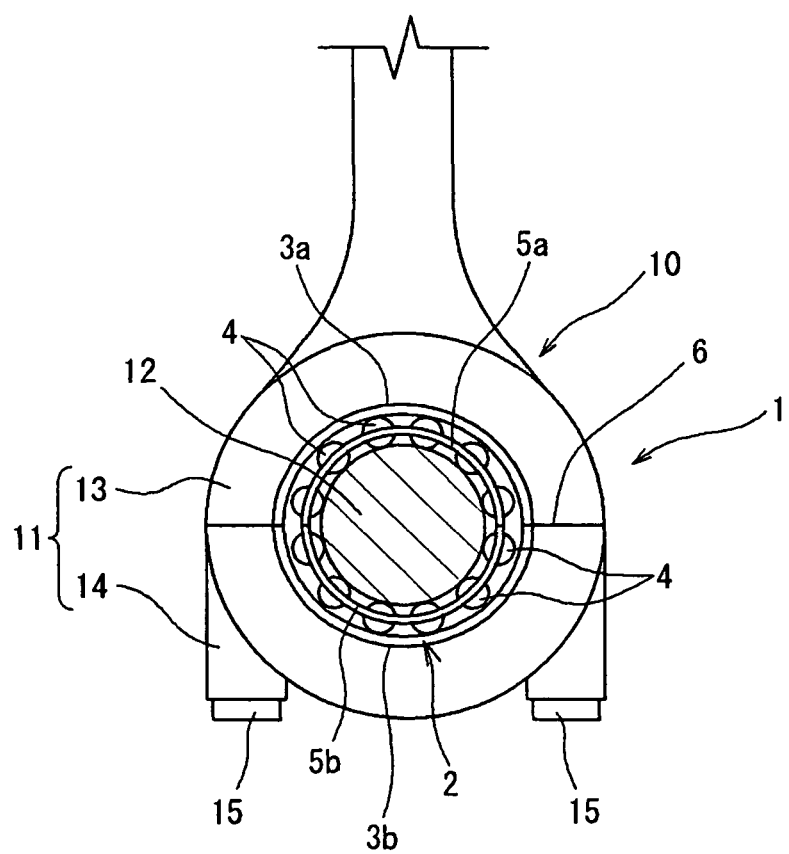
[FIG. 1] This is a cross-sectional explanatory view of a con rod larger end portion to which a bearing structure according to a first embodiment of the present invention is applied.

FIG. 1 is a cross-sectional explanatory view of a larger end portion of a con rod (connecting rod) to which a bearing structure 1 according to a first embodiment of the present invention is applied. The con rod 10 is supported at its larger end portion 11 on a crankshaft 12, and a piston (not shown) is mounted on its smaller end portion side (not shown) through a pin.

The larger end portion 11 is constructed such that a cap portion 14 serving as a second housing portion and having a cross-sectionally generally-semicircular concave portion is fastened and fixed by bolts 15 to a body portion 13 serving as a first housing portion and having a cross-sectionally generally-semicircular concave portion, thereby forming a cross-sectionally generally-circular support hole 16. A two-division rolling bearing 2 is incorporated in the cross-sectionally generally-circular support hole 16 formed by the body portion 13 and the cap portion 14.

The rolling bearing 2 comprises a pair of two-division outer rings 3a, 3b mounted in the support hole 16 in closely-contacted relation thereto, a plurality of rollers 4 serving as rolling elements and so mounted as to be able to roll on inner side surfaces of the two two-division outer rings 3a, 3b, and a pair of two-division cages 5a, 5b holding the rollers 4 such that the rollers are arranged at generally-equal intervals in a circumferential direction, and the crankshaft 12 forms an inner ring member of the rolling bearing 2.

Figure 2:
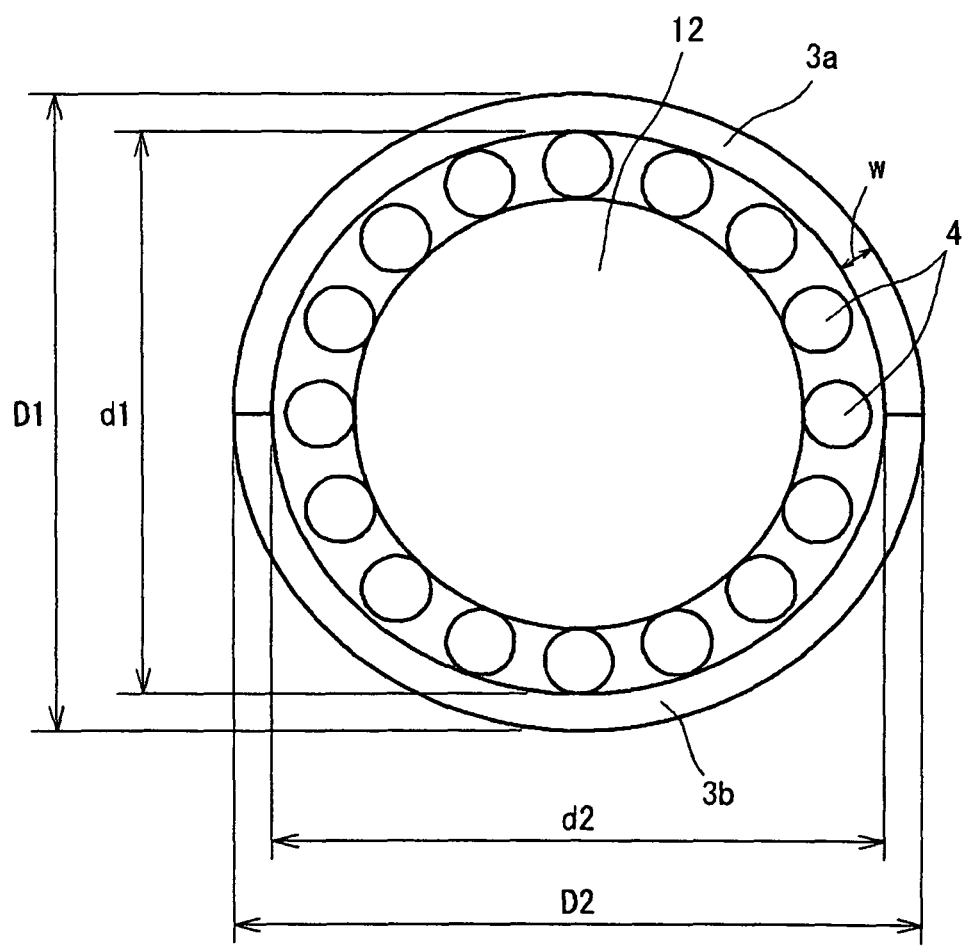
[FIG. 2] This is an enlarged explanatory view of a portion of the bearing structure shown in FIG. 1.

In this embodiment, a bore diameter of the support hole 16 (to which the rolling bearing 2 is internally fitted) in a direction of mating surfaces of the housing portions is made larger than its bore diameter in a direction shifted 90° from the direction of these mating surfaces. Namely, in an enlarged explanatory view of the rolling bearing 2 shown in FIG. 2, a dimension represented by D2 (Although this D denotes an outside diameter dimension of the outer rings 3a, 3b, it is substantially equal to a bore diameter dimension of the support hole 16 since the outer rings 3a, 3b are disposed in close contact with the housing inner peripheral surface.) is made larger than a dimension represented by D1. With this arrangement, since a radial width dimension w of the outer rings 3a, 3b is constant in the circumferential direction, an inside diameter d2 of the outer rings 3a, 3b in the direction of the housing portion mating surfaces is larger than an inside diameter d1 in the direction shifted 90° from the direction of these mating surfaces. In FIG. 2, the showing of the cage is omitted for better understanding.

By providing D2>D1 (d2>d1), spaces larger than the diameter of the rollers 4 can be formed between the outer peripheral surface of the crankshaft 12 and the inner peripheral surfaces of the outer rings 3a, 3b in the vicinities of the mating surfaces of the housing. As a result, the rollers 4 can pass the vicinities of the mating surfaces without sliding contact with the inner peripheral surfaces of the outer rings in the vicinities of the mating surfaces. Even if a step is formed at circumferential end portions of the outer rings 3a, 3b at the mating surface, the generation of vibration and noise by this step when the roller passes can be prevented. Also, premature damage such as cracking, chipping and separation of the rollers 4 and the outer rings 3a, 3b can be prevented from occurring.

The body portion 13 and the cap portion 14 which form the housing are made of a material such as aluminum or aluminum alloy, and the adjustment of the bore diameter of the support hole 16 can be easily effected by machining. As a result, the manufacturing cost of the bearing structure can be reduced.

Figure 3:
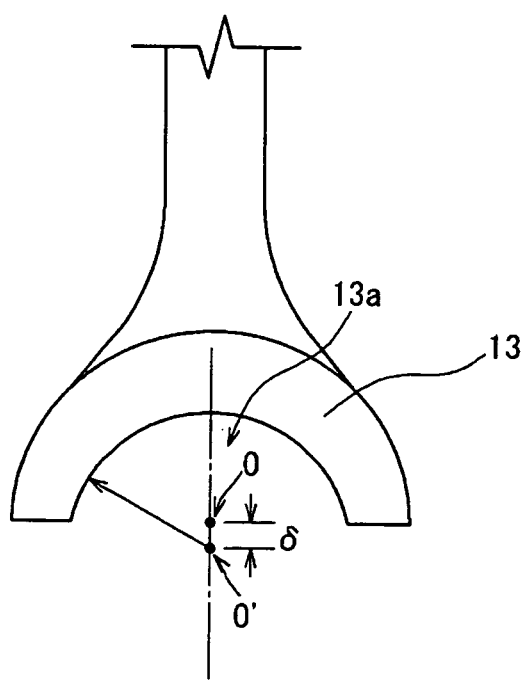
[FIG. 3] This is an enlarged explanatory view of a body portion serving as a first housing portion.

The adjustment of the bore diameter can be effected, for example, by shifting a center O of curvature of a half circle (forming an inner surface of the concave portion 13a of the body portion 13) downwardly by a predetermined distance (δ) along the direction (the upward-downward direction in FIG. 3) shifted 90° from the direction of the mating surfaces, as shown in FIG. 3. When a half circle is described around a new center O' of curvature, the radius in the direction of the housing portion mating surfaces is larger than the radius in the direction shifted 90° from the direction of these mating surfaces. In this case, with respect to the cap portion 14 which is not shown, it is necessary to shift a center of curvature of a half circle (forming an inner surface of the concave portion of the cap portion 14) upwardly (in FIG. 3) by a predetermined distance (δ). In FIG. 3, the amount (δ) of shifting of the curvature center is shown in an exaggerated manner for better understanding.

The difference between D2 and D1 can be set, for example, from 0.01 to 1 mm, and by doing so, the generation of vibration and noise and premature damage due to the above-mentioned step can be prevented while allowing the rollers 4 to roll smoothly.

The adjustment of the bore diameter can also be effected by forming the cross-sectional shape of the support hole 16 into an elliptical shape. At this time, a long axis of the ellipse is caused to coincide with the direction of the housing mating surfaces, and a short axis of the ellipse is caused to coincide with the direction shifted 90° from the direction of the mating surfaces. In this case, also, spaces larger than the diameter of the rollers 4 can be formed between the outer peripheral surface of the crankshaft 12 and the inner peripheral surfaces of the outer rings 3a, 3b in the vicinities of the mating surfaces, and the rollers 4 can pass the vicinities of the mating surfaces without sliding contact with the inner peripheral surfaces of the outer rings in the vicinities of the mating surfaces.

Figure 4:
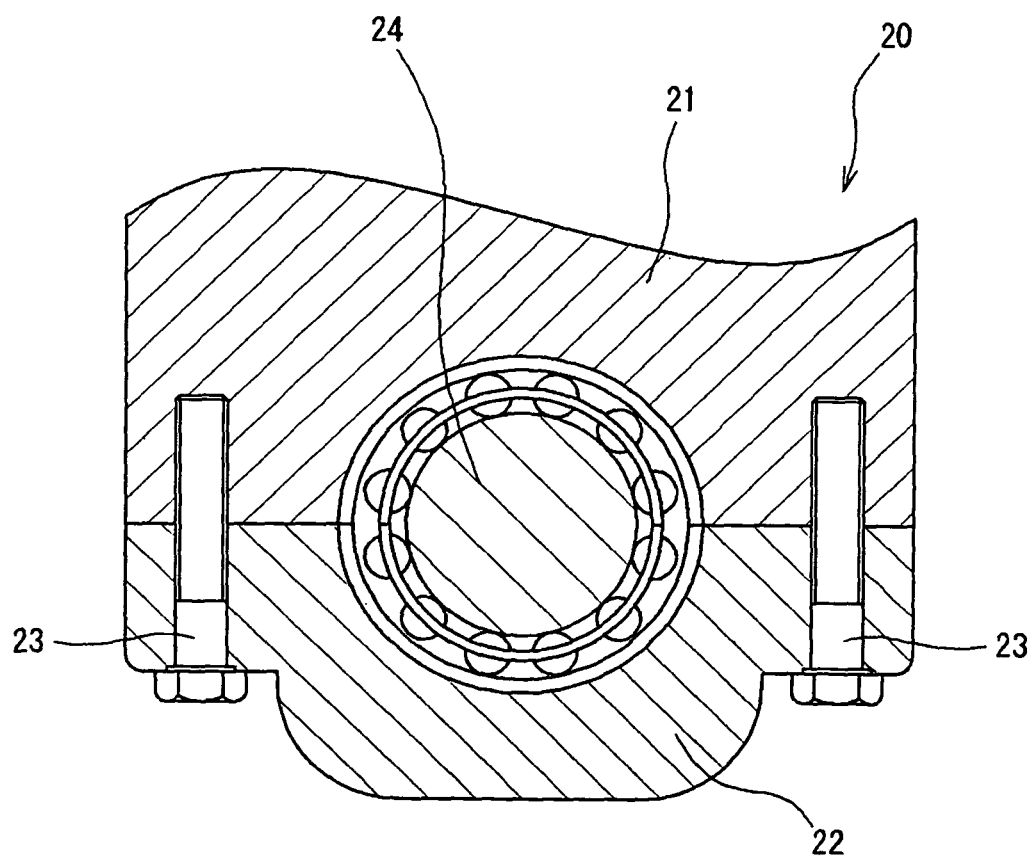
[FIG. 4] This is a cross-sectional explanatory view of a crankshaft fixing portion of an engine to which a bearing structure according to a modified example of the first embodiment of the present invention is applied.

In the above-mentioned embodiment, although the rollers are used as the rolling elements, a bearing using balls may be used. Although the bearing structure is applied to the larger end portion of the connecting rod, it can be used as a crankshaft supporting-purpose bearing disposed within a support hole formed by an upper block 21 which is a housing forming part of a crankshaft fixing portion 20 and a lower block 22 which is a housing and is integrally connected with the upper block 21, as shown in FIG. 4. In FIG. 4, 23 denotes fixing bolts for integrally fixing the upper block 21 and the lower block 22 together, and 24 denotes a support shaft of the crankshaft.

(Second Embodiment)

Figure 5:
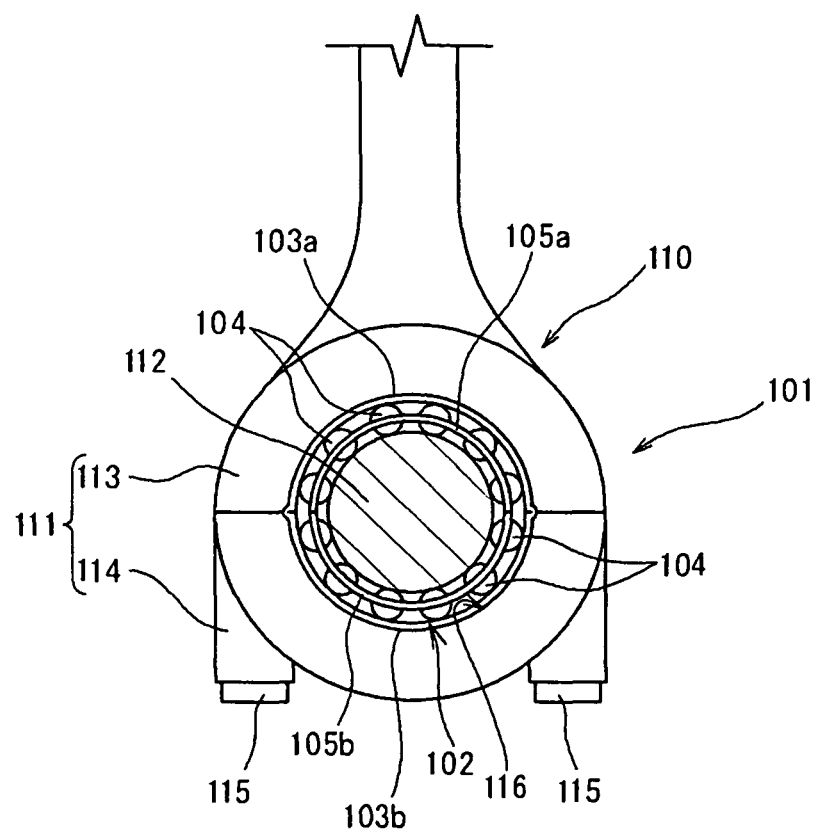
[FIG. 5] This is a cross-sectional explanatory view of a larger end portion of a connecting rod adopting a second embodiment of a bearing structure of the present invention.

FIG. 5 is a cross-sectional explanatory view of a larger end portion 111 of a connecting rod 110 adopting a bearing structure 101 which is a second embodiment of the present invention. The connecting rod 110 has such a structure that a two-division rolling bearing 102 is incorporated in a support hole 116 of the larger end portion 111 which is a housing formed by a first housing section 113 and a second housing section 114, and a crankshaft 112 is further internally fitted thereto. In the present specification, the bearing structure 101 means the structure comprising the housing (the first housing section 113, the second housing section 114 in FIG. 5), and the two-division bearing 102.

The two-division bearing 102 comprises two-division outer rings 103a, 103b, a plurality of rolling elements 104, 104 so mounted as to be able to roll on inner side surfaces of the two-division outer rings 103a, 103b, and two-division cages 105a, 105b holding the plurality of rolling elements 104, 104 at predetermined intervals in a circumferential direction. Circumferential end portions of the two-division outer rings 103a, 103b abut against each other, so that the inner side surfaces of the two-division outer rings 103a, 103b form a radially generally-cross-sectionally circular raceway surface, and the plurality of rolling elements 104, 104 roll on the raceway surface. The plurality of rolling elements 104, 104 are guided and held at the predetermined intervals in the circumferential direction by the two-division cages 105a, 105b. The crankshaft 112 is supported by the plurality of rolling elements 104, 104, and is internally fitted to the two-division bearing 102.

The two-division outer rings 103a, 103b are mounted within the support hole 116 of the housing in closely-contacted relation thereto, so that the two-division bearing 102 is incorporated in the support hole 116.

Figure 6:
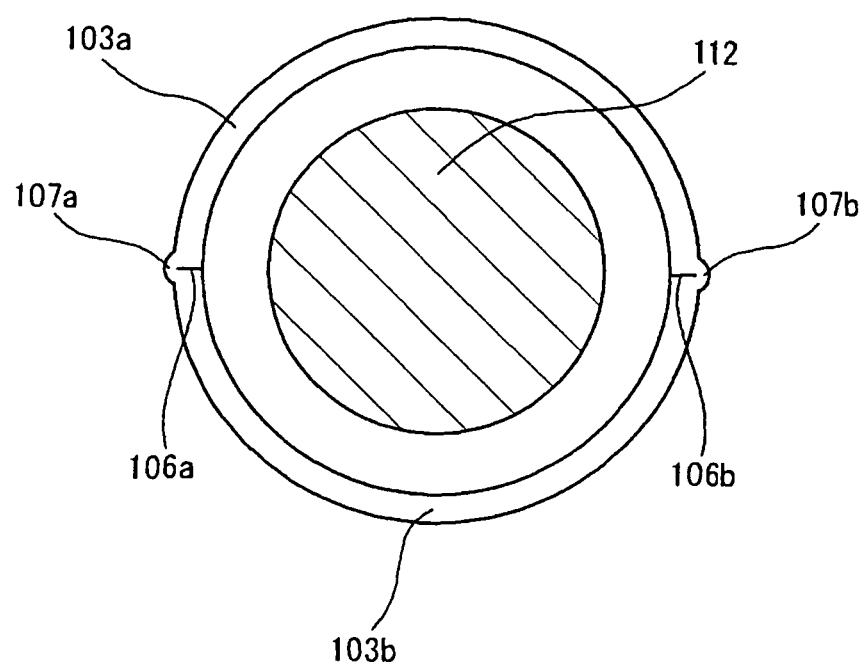
[FIG. 6] This is an enlarged explanatory view of a portion of the bearing structure shown in FIG. 5.

FIG. 6 is an enlarged explanatory view of a portion of the bearing structure 101 shown in FIG. 5. In FIG. 6, in order to plainly explain mating surfaces 106a, 106b of the two-division outer rings 103a, 103b, the cages 105a, 105b and the plurality of rolling elements 104, 104 in FIG. 5 are omitted, and projecting portions 107a, 107b are shown in an exaggerated manner.

As shown in FIG. 6, the circumferential end portions of the two-division outer rings 103a, 103b abut against each other to form the mating surfaces 106a, 106b. Furthermore, as shown in FIG. 6, the circumferential end portions of the two-division outer rings 103a, 103b are fixed to each other so that the projecting portions 107a, 107b each having a radially outwardly-directed height are provided respectively at both of the mating surfaces 106a, 106b. In the bearing structure 101, the projecting portions 107a, 107b are formed by fixing the circumferential end portions of the two-division outer rings 103a, 103b to each other, and therefore the positioning of the housing (the first housing section 113, the second housing section 114) can be easily effected. In the present invention, the above projecting portion may be provided at one of the mating surfaces 106a, 106b.

Although the fixing of the two-division outer rings 103a, 103b to each other can be effected, for example, by welding, bonding or others, it is preferred to adopt spot welding from the viewpoint of easiness of the processing. In this case, even when a complicated processing such for example as a press-shaping processing, a boring processing and a knurling processing for the purpose of suppressing a positional offset in the circumferential direction and the axial direction is not applied to the two-division outer rings, the above positional offset can be suppressed by the simple process of the spot welding, and the manufacturing cost can be reduced. Furthermore, the fixing by the spot welding will not substantially produce any influence on the shape of the inner side surfaces of the two-division outer rings 103a, 103b, and therefore is advantageous in that the raceway surface formed by the inner side surfaces of the two-division outer rings 103a, 103b is formed into such a condition that the plurality of rolling elements 104, 104 can satisfactorily roll thereon.

In the bearing structure 101, the housing comprises the first housing section 113 and the second housing section 114. In the housing, the radially generally-cross-sectionally circular support hole 116 is formed by a concave portion of the first housing section 113 and a concave portion of the second housing portion 114, and the two-division rolling bearing 102 is incorporated in the support hole 116.

Figure 7:
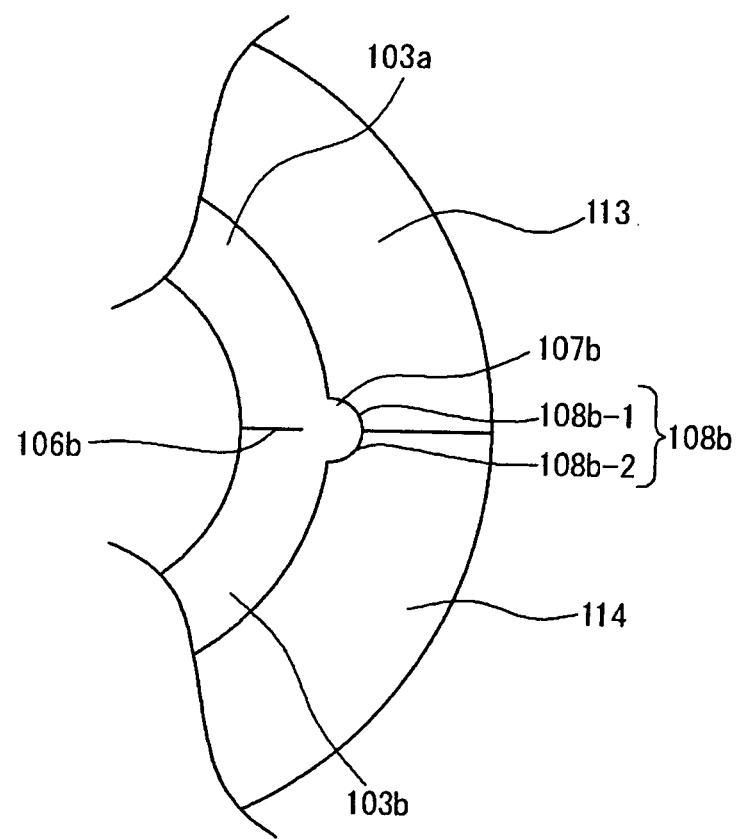
[FIG. 7] This is a fragmentary enlarged explanatory view of the bearing structure shown in FIG. 6.

FIG. 7 is an enlarged explanatory view of a portion of the bearing structure 101 shown in FIG. 6. In FIG. 7, in order to plainly explain the relation between the projecting portion 107b and a recess portion 108b, the cages 105a, 105b and the plurality of rolling elements 104, 104 in FIG. 5 are omitted, and also those portions surrounding the projecting portion 107b are enlarged, and the projecting portion 107b is shown in an exaggerated manner. Notch portions 108b-1, 108b-2 are formed respectively in radially-inward sides of the circumferential end portions of the first housing section 113 and the second housing section 114 abutting against each other. The notch portion 108b-1, 108b-2 have a radially outwardly-directed depth, and form the recess portion 108b at the circumferential inner side surface of the housing (which recess portion has such a shape as to be fitted on the projecting portion 107b) in the condition in which the circumferential end face of the first housing section 113 and the circumferential end face of the second housing section 113 are held against each other.

The notch portions 108b-1, 108b-2 can be easily formed by using, as a mold, a mold having a shape corresponding to the notch portions 108b-1, 108b-2 at the time of producing the first housing section 113 and the second housing section 114, without applying any special processing. Furthermore, the recess portion 108b can be easily formed merely by mounting the housing, comprising the first housing section 113 and the second housing section 114, on the two-division rolling bearing 102, and also can be fitted on the projecting portion 107b. The two-division outer rings 103a, 103b are fixed against movement in both the circumferential direction and the axial direction by the fitting of the recess portion 108b to the projecting portion 107b, and therefore a positional offset of the two-division outer rings 103a, 103b in both the circumferential direction and the axial direction can be suppressed.

Figure 8:
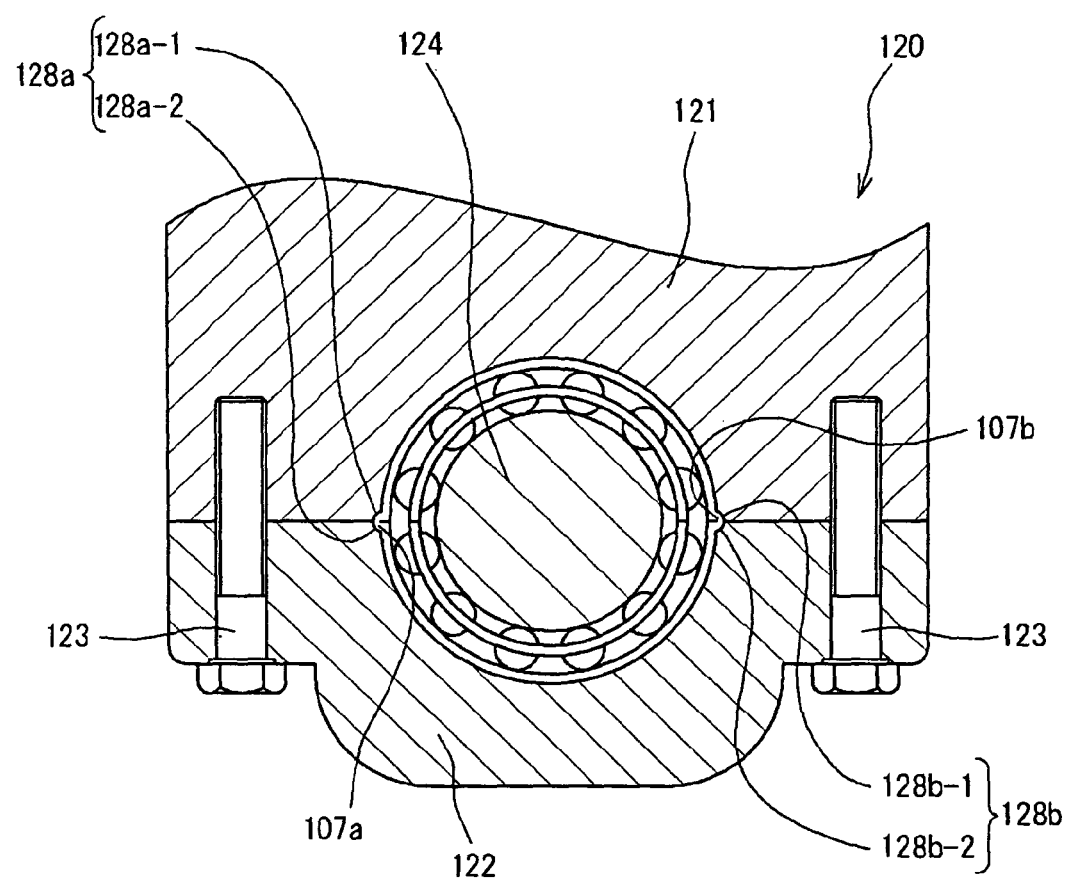
[FIG. 8] This is a cross-sectional explanatory view of a portion of a crankshaft supporting-purpose bearing adopting a bearing structure according to a modified example of the second embodiment of the present invention.

In the embodiment shown in FIG. 5, although the bearing structure 101 is applied to the larger end portion of the connecting rod, it can be applied also to a crankshaft supporting-purpose bearing disposed within a support hole formed by an upper block 121 which is a housing forming part of a crankshaft fixing portion 120 and a lower block 122 which is a housing and is integrally connected with the upper block 121, as shown in FIG. 8. FIG. 8 is a cross-sectional explanatory view of a portion of the crankshaft supporting-purpose bearing adopting a bearing structure which is a modified example of the second embodiment of the present invention. In FIG. 8, 123 denotes fixing bolts for integrally fixing the upper block 121 and the lower block 122 to each other, and 124 denotes a support shaft of the crankshaft. As shown in FIG. 8, in the crankshaft supporting-purpose bearing of this modified example, a recess portion 128a formed by a notch portion 128a-1 of the upper block 121 which is the housing and a notch portion 128a-2 of the lower block 122 which is the housing is fitted on a projecting portion 107a, and also a recess portion 128b formed by a notch portion 128b-1 of the upper block 121 which is the housing and a notch portion 128b-2 of the lower block 122 which is the housing is fitted on a projecting portion 107b. Therefore, a positional offset of the two-division outer rings in both the circumferential direction and axial direction of the housing is suppressed, and also the two two-division outer rings are integrated with each other and can be prevented from being separated.

A manufacturing method according to the second embodiment of the present invention will be described below with reference to FIGS. 5 to 7.

First, the two-division rolling bearing 102 which comprises the pair of two-division outer rings 103a, 103b, the plurality of rolling elements 104, 104 so mounted as to be able to roll on the inner side surfaces of the two-division outer rings 3a, 3b, and the pair of two-division cages 105a, 105b guiding and holding the plurality of rolling elements 104, 104 at the predetermined intervals in the circumferential direction is mounted on the shaft 112, and then the mating surfaces 106a, 106b formed by the circumferential end portions of the two-division outer rings 103a, 103b of the two-division rolling bearing 102 abutting against each other are fixed by spot welding or the like so that the projecting portions 107a, 107a having the radially outwardly-directed height can be provided [Step (I)].

Then, as shown in FIG. 7, the circumferential end faces of the first housing section 113 and the circumferential end faces of the second housing section 114 are held against each other so that the recess portion 108 formed by the notch portion 108a of the first housing section 113 and the notch portion 108b of the second housing section 114 can be fitted to the projecting portion 107b, thereby mounting the housing on the two-division rolling bearing 102 fixed in the above Step (I) [Step (II)]. As a result, the two-division outer rings 103a, 1103b are disposed in a fixed condition relative to the housing, and a positional offset of the two-division outer rings 103a, 103b in the circumferential direction and the axial direction can be suppressed.

Thus, in the manufacturing method according to the second embodiment of the present invention, merely by effecting the step of fixing the mating surfaces 106a, 106b of the two-division outer rings 103a, 103b, the projecting portions 107a, 107b can be easily provided, and in cooperation with the fitting of the recess portion 108 to the projecting portion 107b as a result of mounting of the housing, a positional offset of the two-division outer rings 103a, 103b in the circumferential direction and the axial direction can be suppressed. Therefore, as compared with the case where a special processing, such for example as a press-shaping processing, a boring processing and a knurling processing, for suppressing a positional offset in the circumferential direction and the axial direction is beforehand applied to the two-division outer rings 103a, 103b themselves as in the past, the processing is easy. Furthermore, since the projecting portions 107a, 107b are provided at the mating surfaces 106a, 106b of the two-division outer rings 103a, 103b, the positioning of the housing can be easily carried out.

[Third Embodiment]

Figure 9:
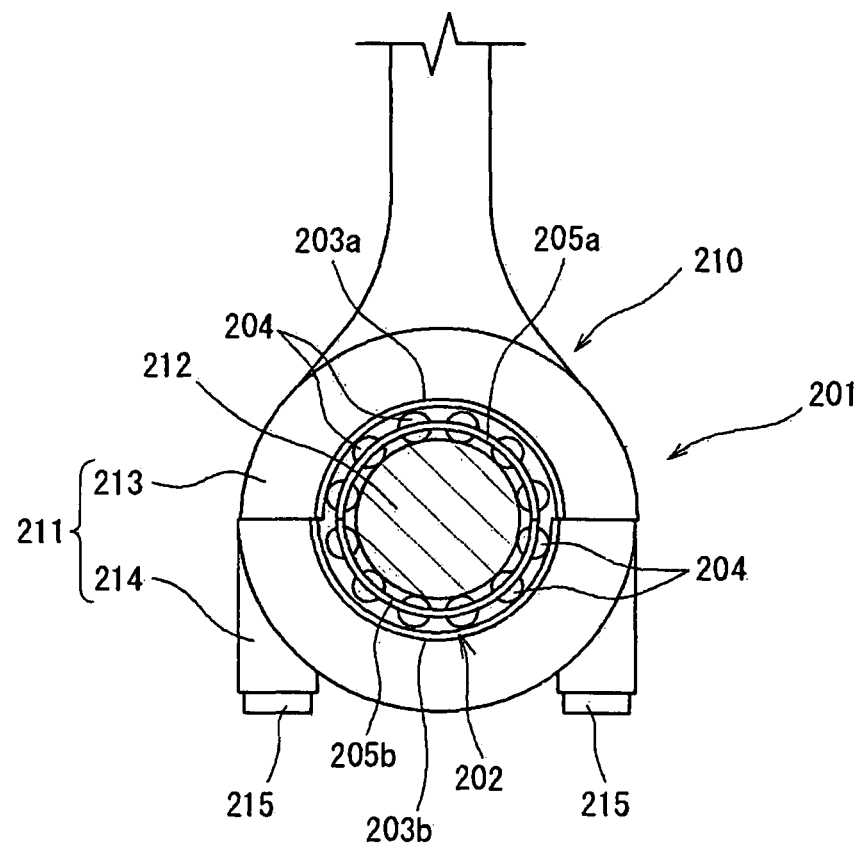
[FIG. 9] This is a cross-sectional explanatory view of a con rod larger end portion to which a bearing structure according to a third embodiment of the present invention is applied.

FIG. 9 is a cross-sectional explanatory view of a larger end portion of a con rod to which a bearing structure 201 according to a third embodiment of the present invention is applied. The con rod 210 is supported at its larger end portion 211 on a crankshaft 212, and a piston (not shown) is mounted on its smaller end portion side (not shown) through a pin.

The larger end portion 211 is constructed such that a cap portion 214 serving as a second housing and having a cross-sectionally generally-semicircular concave portion is fastened and fixed by bolts 215 to a body portion 213 serving as a first housing and having a cross-sectionally generally-semicircular concave portion, thereby forming a cross-sectionally generally-circular support hole 216. A two-division rolling bearing 202 is incorporated in the cross-sectionally generally-circular support hole 16 formed by the body portion 213 and the cap portion 214.

The rolling bearing 202 comprises a pair of two-division outer rings 203a, 203b mounted in the support hole 216 in closely-contacted relation thereto, a plurality of rollers 204 serving as rolling elements and so mounted as to be able to roll on inner side surfaces of the two two-division outer rings 203a, 203b, and a pair of two-division cages 205a, 205b holding the rollers 204 such that the rollers are arranged at generally-equal intervals in a circumferential direction, and the crankshaft 212 forms an inner ring member of the rolling bearing 202.

Figure 10:
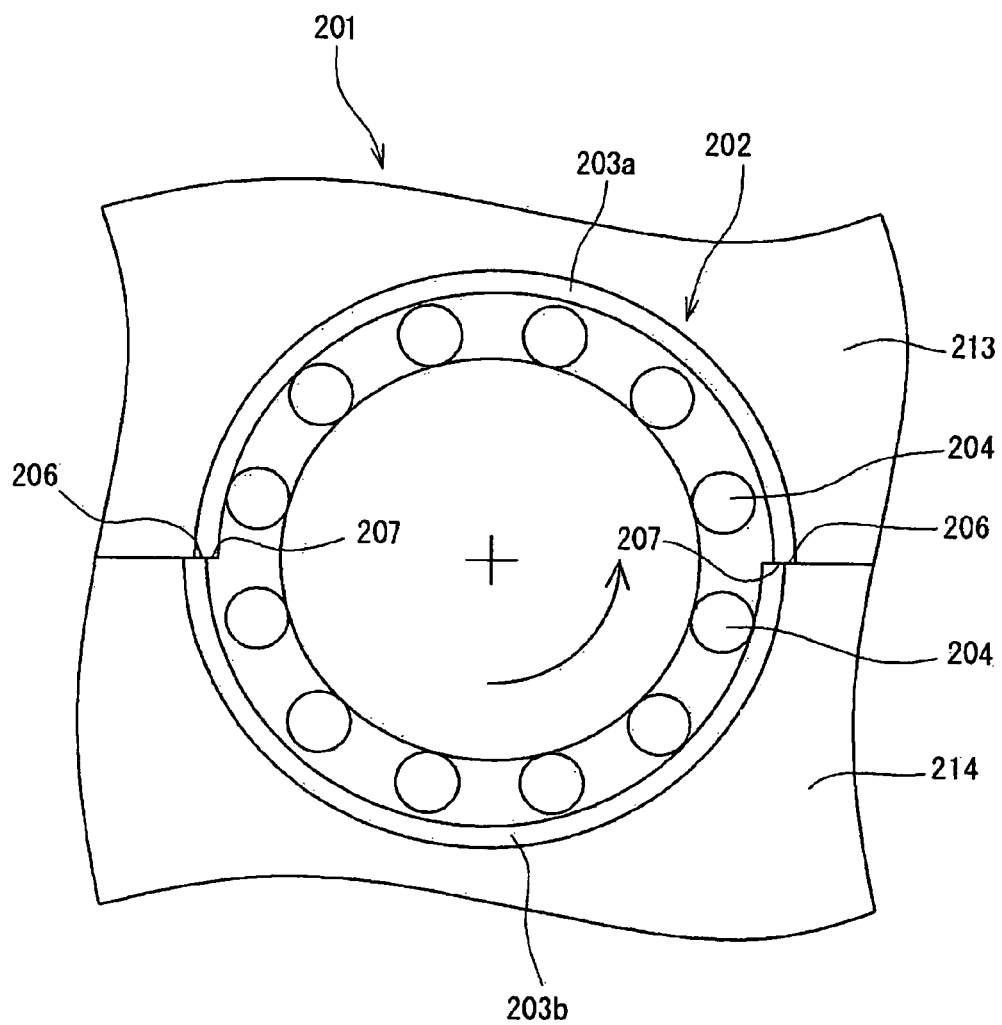
[FIG. 10] This is an enlarged explanatory view of the bearing structure shown in FIG. 9.
Figure 11:
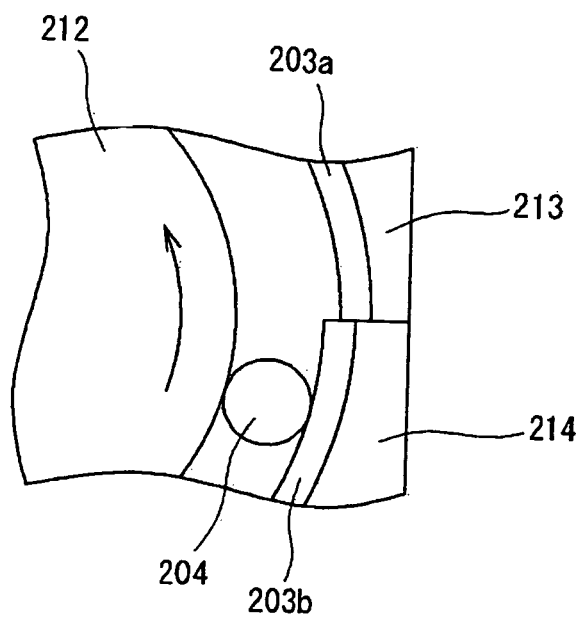
[FIG. 11] This is explanatory views at the time when a roller passes the vicinity of an outer ring mating surface.
Figure 11:
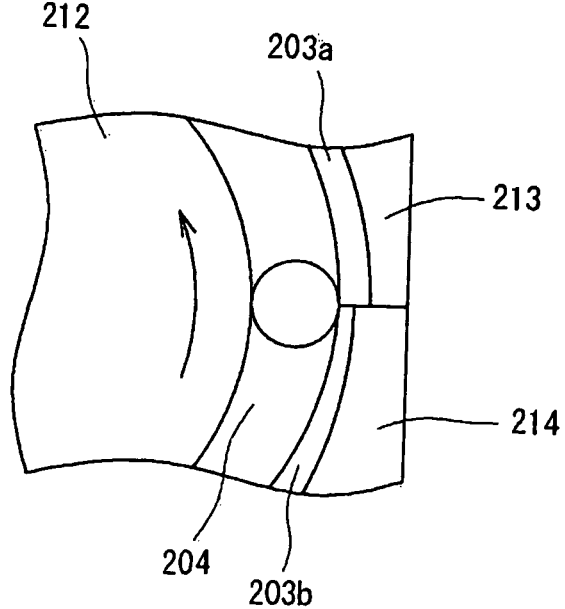

In this embodiment, as schematically shown in FIG. 10, the body portion 213 and the cap portion 214 are mounted in offset relation to each other in a radial direction so that at mating surfaces 206 of circumferential end portions of the two-division outer rings 203a, 203b, the outer ring end portions disposed at the upstream side with respect to a direction of rotation of the crankshaft 212 can form respective steps 207 projecting inwardly in the radial direction (the direction perpendicular to an axial direction of the crankshaft 212). The size (the amount of radially-inwardly projecting) of the step 207 is so set as to be generally equal to the amount of elastic deformation by a rolling element load which the outer ring end portion disposed at the upstream side with respect to the direction of rotation of the crankshaft 212 receives from the rollers 204. In FIG. 10 and FIG. 11 later mentioned, the showing of the two-division cages 205a, 205b is omitted for better understanding.

This elastic deformation amount varies depending on materials forming the two-division outer rings 203a, 203b and the body portion 213 and the cap portion 214 serving as the housing (When the outer rings 203a, 203b are thin, the inner peripheral portion of the housing holding the rolling bearing 202 may also be elastically deformed by the rolling element load), the number of revolutions of the crankshaft 212, the number of the rollers 204 and so on, and can be beforehand found by making experiments and calculations. For example, in the case where the two-division outer rings 203a and 203b are made of bearing steel, while the body portion 213 and the cap portion 214 are made of aluminum alloy, the step 207 can be set to $1/100$ to $3/100$ mm in accordance with the load obtained when the number of revolutions of the crankshaft 212 is 2,000 to 3,000 rpm. Then, the body portion 213 and the cap portion 214 are mounted in offset relation to each other in the radial direction so that the steps 207 can be formed. This offset amount can be adjusted, for example, by radially changing the positions of formation of bolt holes for the bolts 215 for fixing the body portion 213 and the cap portion 214 together.

FIG. 11 is explanatory views at the time when the roller 204 pass the vicinity of the mating surface 206 of the two-division outer rings 203a, 203b, and the step 207 at the circumferential end portion of the two-division outer ring 203b disposed at the upstream side with respect to the direction of rotation of the crankshaft 212 is elastically deformed by the rolling element load which it receives from the roller 204, and as a result a raceway surface in the vicinity of the mating surface 206 of the two-division outer rings 203*a* and 203*b* is formed into a flat continuous surface when the roller passes (see FIG. 11(*b*)).

Thus, by thus beforehand combining the two-division outer rings 203*a*, 203*b* in offset relation to each other in the radial direction in accordance with the expected elastic deformation, the raceway surface is formed into the continuous surface by the elastic deformation due to the rolling element load, and the generation of vibration and noise when the roller passes can be suppressed.

Furthermore, inclined surfaces and rounded corner portions as in the conventional techniques do not need to be formed at the circumferential end portions of the two-division outer rings 203*a*, 203*b*, and it is only necessary to merely mount the body portion 213 and the cap portion 214 (which support the rolling bearing 202) such that they are offset from each other in the radial direction by the predetermined amount. Therefore, the processing is simple, and the manufacturing cost can be reduced.

Figure 12:
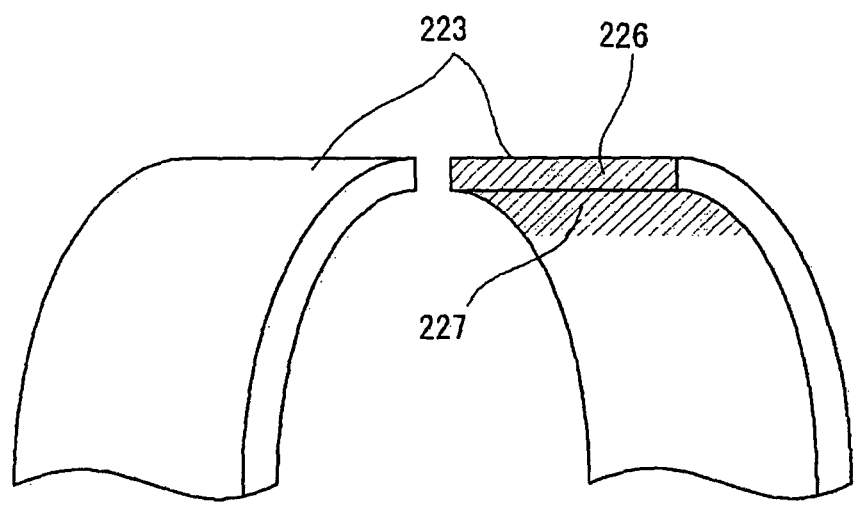
[FIG. 12] This is an explanatory view of two-division outer rings in a modified example of the third embodiment of the bearing structure of the present invention.

FIG. 12 shows two-division outer rings 223 in a modified example of the third embodiment of the present invention, and a surface treatment of an excellent lubricating ability is applied to mating surfaces 226 of circumferential end portions of the two-division outer rings 223 and their neighboring outer ring inner peripheral surfaces 227 (The surface treatment is applied to the portions indicated by hatching in FIG. 12). Specifically, for example, a coating of molybdenum disulfide is applied to the mating surface 226 and its neighboring outer ring inner peripheral surface. Thanks to the surface treatment of the excellent lubricating ability applied to the mating surface 226 and its neighboring outer ring inner peripheral surface, even when a slight step develops at the mating surface 226, the vicinities of this step can be covered with the lubricating component, so that the step can be made smooth, and vibration and noise generated when the roller passes the step can be suppressed.

In the present invention, the size of the step is set in accordance with the expected elastic deformation, but when the number of revolutions of the shaft exceeds the set range or in other cases, the level of the elastic deformation may become larger or smaller than expected. As a result, a slight step develops at the mating surface 226, and it is thought that noise and vibration due to this step may be generated. However, by applying the surface treatment of the excellent lubricating ability, this step can be made smooth, and therefore the generation of the above noise and vibration can be suppressed.

Furthermore, even when a step develops, this step can be made smooth if this step is slight, and therefore dimensional tolerances at the time of effecting the processing and the assembling can be made larger.

Figure 13:
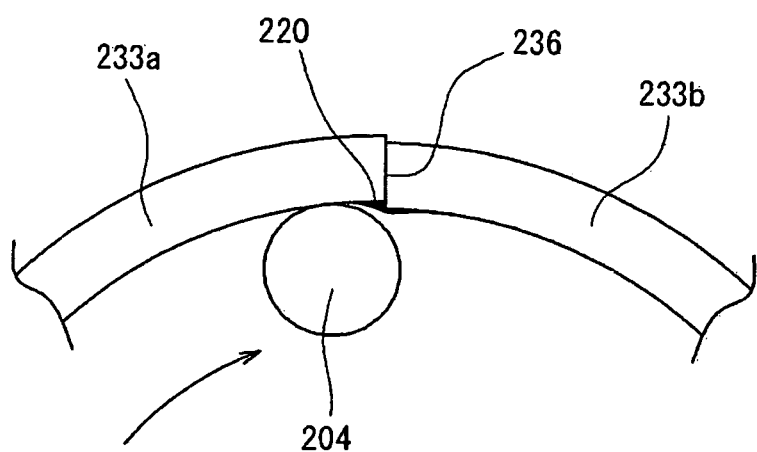
[FIG. 13] This is an explanatory view of the vicinities of an outer ring mating surface in another modified example of the third embodiment of the bearing structure of the present invention.

FIG. 13 is an explanatory view of another modified example of the third embodiment of the bearing structure of the present invention. In this embodiment, a soft lubricating coating made of a synthetic resin such as PTFE (polytetrafluoroethylene) is formed on a mating surface 236 of circumferential end portions of two-division outer rings 233*a*, 233*b* and its neighboring inner peripheral surfaces. In this case, the lubricating coating is made of the soft synthetic resin, and therefore a corner of the lubricating coating comes off when the roller 204 passes a step, and the taken-off coating portion 220 fills up the step. As a result, the step is eliminated, and because of the lubricating coating, the roller 204 can smoothly pass the step portion.

Furthermore, in the first to third embodiments, although the rollers are used as the rolling elements, a bearing using balls may be used. Furthermore, although the crankshaft has been illustrated as the shaft internally fitted to the bearing, the bearing structures of the present invention can be applied to other shafts such as a camshaft.

Figure 14:
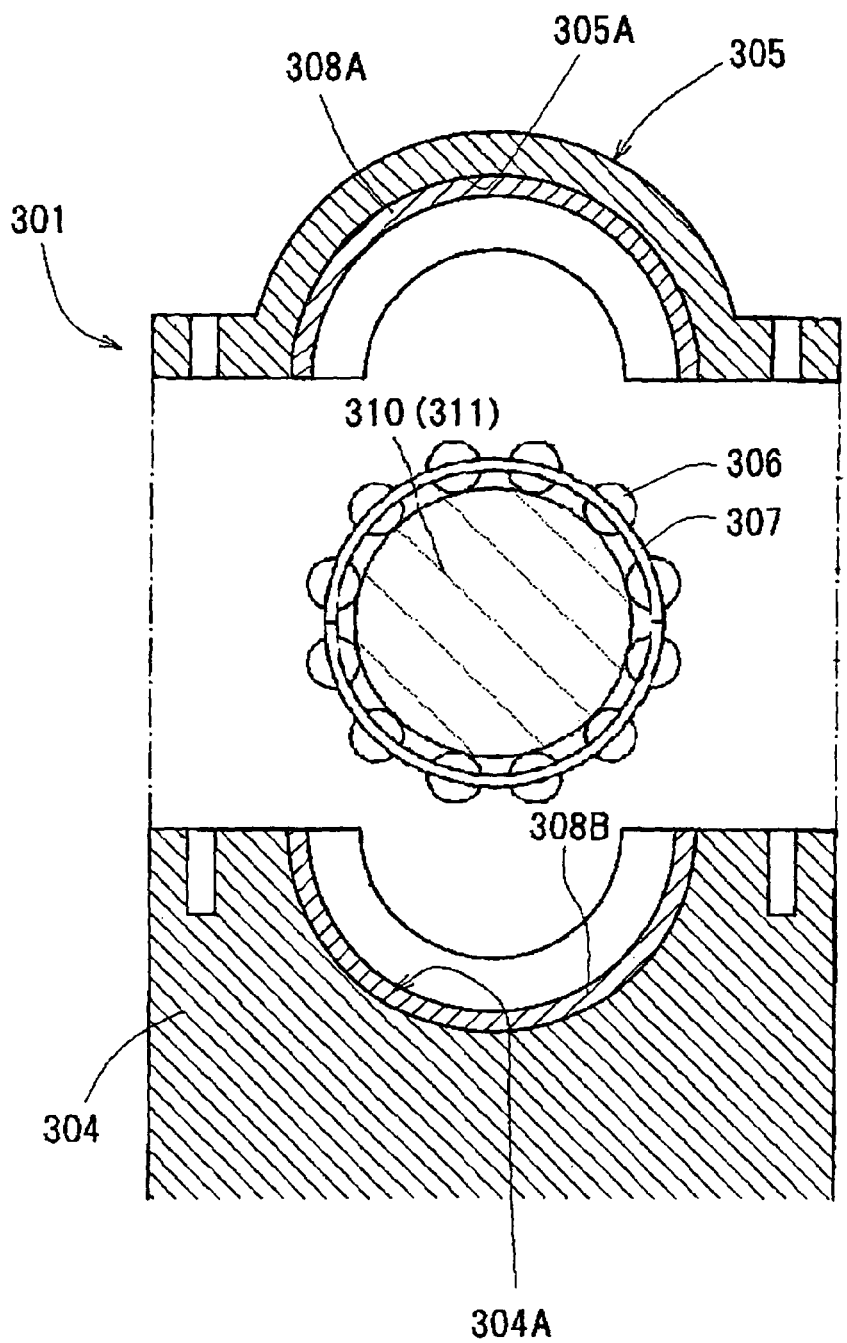
[FIG. 14] This is an example in which a bearing structure of the present invention is applied to a camshaft.
Figure 15:
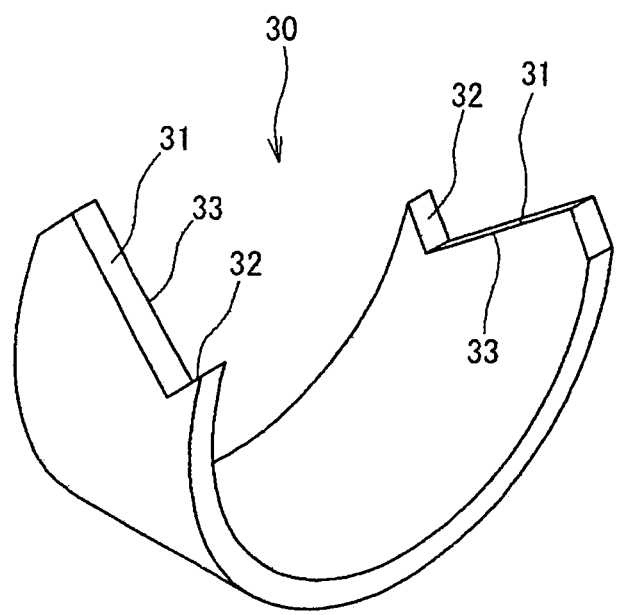
[FIG. 15] This is explanatory views of a two-division outer ring in a conventional divided-type bearing.
Figure 15:
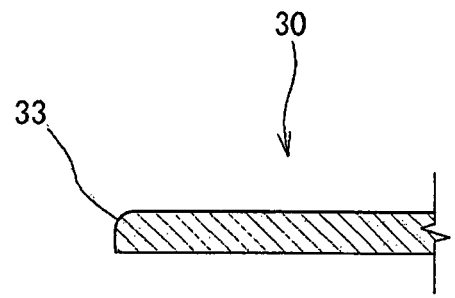
Figure 16:
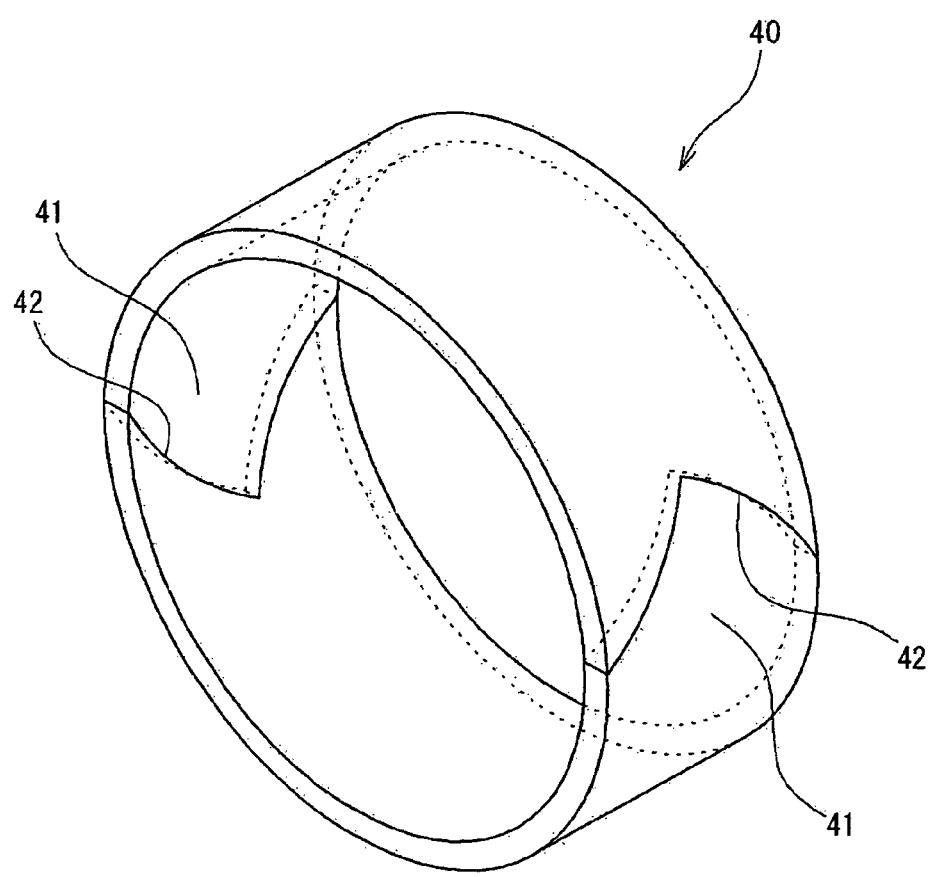
[FIG. 16] This is an explanatory view of two-division outer rings in a conventional divided-type bearing.

FIG. 14 shows an example in which a bearing structure of the present invention is applied to a camshaft.

A divided-type bearing structure 301 corresponding to the bearing structures 1, 101, 201 of the first to third embodiments is so constructed as to support a shaft body 311 of the cam shaft 310. The cam shaft 310 has a plurality of cams (not shown) formed integrally on the shaft body 311, and in accordance with the rotation of the camshaft 310, each cam is adapted to downwardly depresses a cam follower (not shown) disposed thereunder.

Incidentally, camshafts includes ones of the assembling type in which cams made separately from a shaft body are mounted and ones of the integral type in which a shaft body and cams are formed integrally with each other. In the above integral-type cam shaft, the cams already exist at various portions of the shaft body in an axial direction thereof, and therefore a divided-type rolling bearing such as a roller bearing in which an outer ring and a cage have a two-division structure can be suitably used.

The divided roller bearing structure 301 is provided at an outer periphery of a support portion of the shaft body 311 of the camshaft 310, and comprises a roller bearing, and a cam cap 305 for fixing the roller bearing 3 between it and a housing 304. FIG. 14 shows a condition before the cam cap 305 is fixed to the housing 304.

The roller bearing includes a plurality of rollers 306, a cage 307 holding these rollers 306 at equal intervals in a circumferential direction, and a two-division outer ring comprising two generally-semicircular arc-shaped outer ring division bodies 308A, 308B. Although the construction of the outer ring division bodies 308A, 308B and the constructions of outer ring holding surfaces 304A, 305A of the housing 304 and cam cap 305 are not described in detail, similar constructions described in detail for the first embodiment are applied. The camshaft 310 can be supported not only using the first embodiment but also using by the constructions of the second embodiment and the third embodiment.

When the bearing structure of the present invention is applied to the camshaft, also, similar advantages as obtained when it is applied to the crankshaft can be obtained.

The invention claimed:

1. A bearing structure, comprising:
   a housing comprising a first housing portion comprising a cross-sectionally generally-semicircular concave portion and a second housing portion comprising a cross-sectionally generally-semicircular concave portion forming together with the concave portion of the first housing portion a cross-sectionally generally-circular support hole; and
   a two-division rolling bearing comprising a pair of outer ring segments mounted within the support hole of the housing in closely-contacted relation thereto, a plurality of rolling elements so mounted as to be able to roll on inner side surfaces of the pair of outer ring segments, and a two-division cage holding the rolling elements such that the rolling elements are arranged at generally equal intervals in a circumferential direction, a shaft being internally fitted to the two-division rolling bearing,
   wherein said first housing portion and said second housing portion are mounted in an offset relation to each other in a radial direction so that at mating surfaces of circumferential end portions of said pair of outer ring segments, the outer ring end portions disposed at an upstream side with respect to a direction of rotation of the shaft form radially inwardly-projecting steps, respectively, and wherein a size of said step is so set as to be generally equal to an amount of elastic deformation by a rolling element load which the outer ring end portion disposed at the upstream side with respect to the direction of rotation of the shaft receives from the rolling elements.

2. A bearing structure as set forth in claim 1, wherein a lubricating coating is formed on said mating surface and a neighboring outer ring inner peripheral surface.

3. A bearing structure as set forth in claim 2, wherein said lubricating coating comprises a synthetic resin.

4. A bearing structure as set forth in claim 3, wherein said resin comprises polytetrafluoroethylene.

5. A bearing structure as set forth in claim 3, wherein a portion of the coating is removed by the rolling elements passing the step, and fills the step.

6. A bearing structure as set forth in claim 1, wherein said shaft comprises a crankshaft supporting a larger-diameter portion of a connecting rod.

7. A bearing structure as set forth in claim 1, wherein said shaft comprises a camshaft having a cam formed thereon.

* * * * *